Patented July 1, 1930

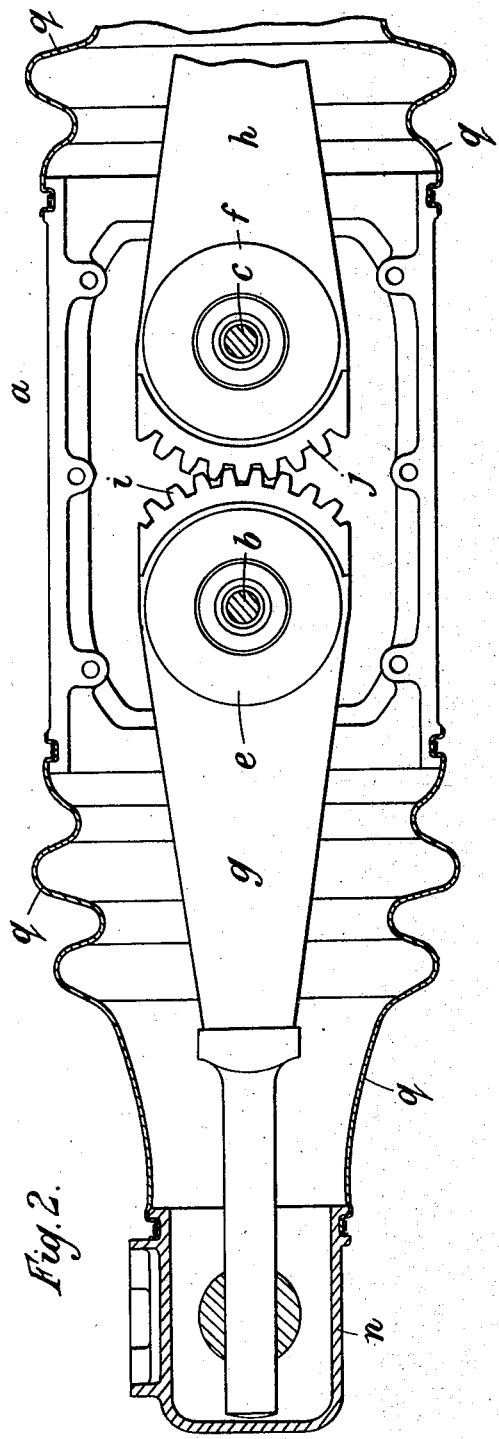
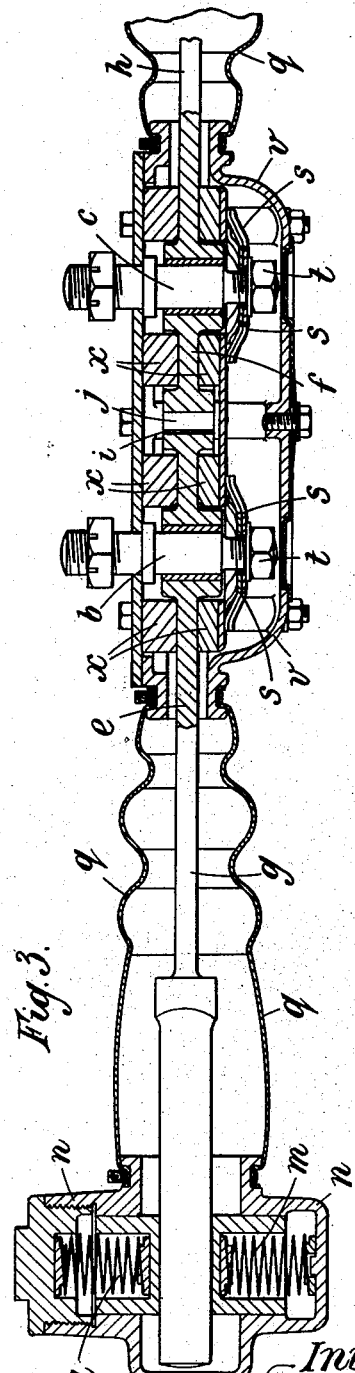

1,769,503

UNITED STATES PATENT OFFICE

FRANÇOIS FEYENS, OF BRUSSELS, BELGIUM, ASSIGNOR TO SOCIÉTÉ GÉNÉRALE D'ETUDES INDUSTRIELLES, GENERAL RESEARCH CORPORATION, SOCIÉTÉ ANONYME, OF BRUSSELS, BELGIUM

STABILIZER FOR USE ON MOTOR VEHICLES

Application filed July 30, 1928, Serial No. 296,316, and in Belgium August 10, 1927.

This invention relates to the suspension of motor vehicle chassis on their axles and has for its object a device whereby the chassis tends to remain parallel, laterally, to the axles.

The invention will be described with reference to the back axle of a motor vehicle, on which the chassis is suspended by a spring at each end of the axle, but it is applicable to the suspension on any axle by any system of springs.

In the accompanying drawings:—

Figure 2 is an elevation, partly in section, of a constructional form of the device, with parts removed, and Figure 3 is a horizontal section taken on the line 3—3 of Figure 2.

Figure 1:
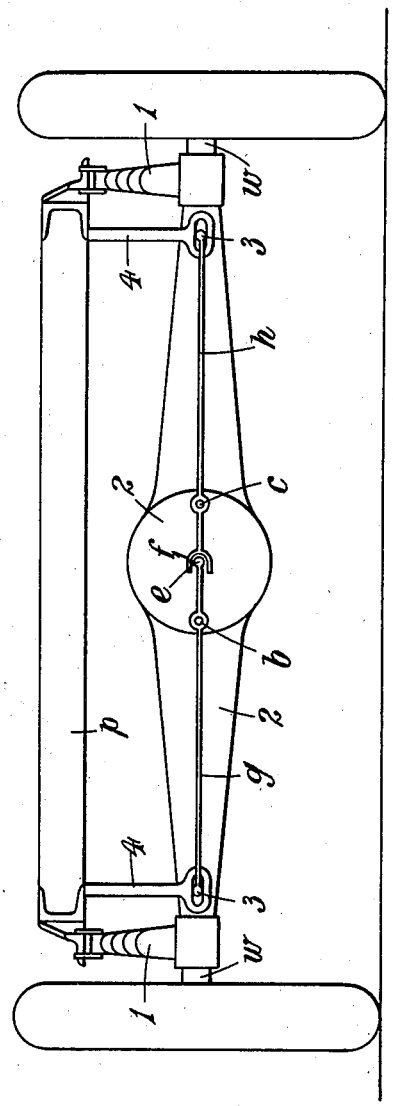
Figure 1 represents diagrammatically the chassis of a motor vehicle suspended on a back axle.

The general principle involved in the invention will be best understood from Figure 1 in which the chassis $p$ is shown as suspended by springs 1, 1, on the back axle casing 2. Two levers $g$, $h$, are pivoted at $b$, $c$, respectively to the casing 2. Their inner ends $e$, $f$, are connected together, either by sliding pivot as shown in Figure 1, or by toothed gearing as illustrated in Figures 2 and 3. Their outer ends are pivoted at 3 to members 4 attached to the chassis, provision being made for small lateral motion, as for instance, by the sliding pivots shown at 3.

If, say, downward pressure be applied to the left-hand side of the chassis, causing this side to descend, pressure in applied through the levers $g$, $h$, tending to cause the right-hand side of the chassis to descend to a corresponding extent.

The connection between the outer ends of the levers $g$, $h$, and the chassis may be through cushioning springs, permitting a small movement of the levers relative to the chassis, either vertically or horizontally (fore and aft of the chassis) or both.

As indicated in Figures 2 and 3, the two levers $g$, $h$, are pivoted within a box or casing $a$, which is fixed rigidly to the back axle casing by any suitable means. Two cylindrical pivots $b$, $c$, rigidly attached to the so-called bottom plate $d$ of the casing $a$, act as the points of articulation of the ends or feet $e$ and $f$ of the levers $g$ and $h$, respectively. The two ends $e$, $f$, are provided each with a toothed sector $i$, $j$, respectively, which are always in mesh and can work either in oil, graphite or other lubricant, or dry.

As shown in Figure 3, the outer end of each of the levers $g$, $h$, slidingly engages with a cylindrical plunger acted upon by two symmetrically disposed springs $l$, $m$, within a housing or box $n$, rigidly connected to the chassis.

The casing $a$ is closed by a lid $v$, Figure 3, and the members contained in said casing are protected against dust and water, by flexible dust-tight closures or sheaths $q$ made of leather or the like, fixed to respectively opposite ends of the casing $a$ and also to the boxes $n$.

By referring particularly to Figures 1 and 2, it will readily be seen that any angular movement of either of the levers $g$, $h$, consequent upon a vertical displacement of the side frame of the chassis $p$ in relation to the casing $a$ and the axle casing to which said casing is attached, will be transmitted through the agency of the toothed sectors $i$ and $j$, to the other of said levers so that both of these levers must necessarily move correspondingly, the sliding engagement of the levers $g$, $h$, with the before mentioned spring-pressed plungers providing the necessary play. Thus, it will be seen that in these circumstances the plane (regarded in a transverse sense) of the side frames of the chassis $p$, will always remain parallel to the longitudinal axis of the axle $w$ (Figure 1) during their relative vertical displacements consequent upon shocks received on one or other of the sides of the chassis.

Finally, to damp or brake the angular movements of the levers $g$, $h$, the bosses $e$ and $f$ of said levers are gripped between discs or washers $x$ of wood or other friction resisting material under the action of springs $s$ the pressure exerted by which can be regulated at will by nuts $t$ turnable on the reduced threaded ends of the pivots $b$ and $c$ and easily accessible from outside by removing the cap $u$ bolted to the lid $v$ of the casing $a$.

Having described my invention, I declare that what I claim and desire to secure by Letters Patent is:—

1. In a device for stabilizing the chassis of a motor vehicle in relation to a road-wheel axle, the combination with said axle and a casing therefor, of two pivots in fixed relation to the casing having parallel axes, two levers respectively turnable on the pivots, intermeshing toothed sectors on the inner ends of the two levers, housings fast to the sides of the chassis receiving the outer ends of the levers, and springs within the housings adapted to exert pressure in relatively opposite directions on each of the said outer ends.

2. In a device for stabilizing the chassis of a motor vehicle in relation to a road-wheel axle, the combination with said axle and a casing therefor, of two pivots in fixed relation to the casing having parallel axes, two levers respectively turnable on the pivots, intermeshing toothed sectors on the inner ends of the two levers, housings fast to the sides of the chassis receiving the outer ends of the levers, plungers within the housings slidingly receiving the said outer ends, and springs pressing on each plunger in relatively opposite directions.

3. In a device for stabilizing the chassis of a motor vehicle in relation to a road-wheel axle, the combination with said axle and a casing therefor, of two pivots in fixed relation to the casing having parallel axes, two levers respectively turnable on the pivots and interengaged at their inner ends, housings fast to the sides of the chassis receiving the outer ends of the levers, plungers within the housings slidingly receiving said outer ends of the levers, springs pressing on each plunger in relatively opposite directions, washers bearing frictionally upon the inner ends of said levers and encircling said pivots, springs bearing upon the washers, and means adjustable for varying the pressure exerted by said springs.

4. In a device for stabilizing the chassis of a motor vehicle in relation to a road-wheel axle, the combination with said axle and a casing therefor, of two pivots in fixed relation to the casing having parallel axes, two levers respectively turnable on the pivots and interengaging at their inner ends, housings fast to the sides of the chassis receiving the outer ends of the levers, plungers within the housings slidingly receiving the said outer ends, and springs pressing on each plunger in relatively opposite directions.

In witness whereof I have affixed my signature hereto.

FRANÇOIS FEYENS.